(12) United States Patent
Galperin et al.

(10) Patent No.: US 7,346,131 B2
(45) Date of Patent: Mar. 18, 2008

(54) SYSTEM AND METHOD FOR PRE-FFT OFDM FINE SYNCHRONIZATION

(75) Inventors: Noam Galperin, Maalot (IL); Yonatan Manor, Haifa (IL)

(73) Assignee: Zoran Corporation, Sunnyvale, CA (US)

( * ) Notice: Subject to any disclaimer, the term of this patent is extended or adjusted under 35 U.S.C. 154(b) by 756 days.

(21) Appl. No.: 10/193,102

(22) Filed: Jul. 10, 2002

(65) Prior Publication Data

US 2004/0008802 A1 Jan. 15, 2004

(51) Int. Cl.
*H03D 1/00* (2006.01)
*H04L 27/06* (2006.01)

(52) U.S. Cl. .................. 375/343; 375/260; 375/340; 375/355; 375/371

(58) Field of Classification Search ............... 375/343, 375/340, 355, 260, 371
See application file for complete search history.

(56) References Cited

U.S. PATENT DOCUMENTS

| | | | |
|---|---|---|---|
| 5,652,772 A | 7/1997 | Isaksson et al. ............ 375/376 |
| 5,771,224 A | 6/1998 | Seki et al. ................. 370/206 |
| 5,838,734 A | 11/1998 | Wright ...................... 375/316 |
| 5,867,532 A | 2/1999 | Ito et al. ................... 375/265 |
| 5,920,598 A | 7/1999 | Hyakudai et al. .......... 375/316 |
| 5,987,063 A | 11/1999 | Rinne ........................ 375/226 |
| 6,058,121 A | 5/2000 | Kim et al. .................. 370/480 |
| 6,067,295 A * | 5/2000 | Bahai et al. ................ 370/350 |
| 6,137,847 A | 10/2000 | Stott et al. ................. 375/344 |
| 6,304,611 B1 * | 10/2001 | Miyashita et al. .......... 375/260 |
| 6,426,978 B1 * | 7/2002 | Bottomley et al. ......... 375/265 |
| 6,711,221 B1 * | 3/2004 | Belotserkovsky et al. .. 375/355 |
| 6,720,824 B2 * | 4/2004 | Hyakudai et al. .......... 329/304 |
| 2003/0012308 A1 * | 1/2003 | Sampath et al. ............ 375/340 |

OTHER PUBLICATIONS

Optimum receiver design for wireless broad-band systems using OFDM. I, Speth, M.; Fechtel, S.A.; Fock, G.; Meyr, H.;☐☐Communications, IEEE Transactions on vol. 47, Issue 11, Nov. 1999 pp. 1668-1677, Digital Object Identifier 10.1109/26.803501*

(Continued)

*Primary Examiner*—Ted Wang
(74) *Attorney, Agent, or Firm*—Morgan, Lewis & Bockius LLP

(57) ABSTRACT

A synchronization unit for performing fine synchronization in the Time Domain, the synchronization unit includes a storage configured to store reference signals. A multiplier capable of calculating sum of zero product shift, sum of minus one product shift, and sum of plus one product shift, based on the reference signals. A signal analyzer capable of computing left, center, and right cross-correlation points based on the sum of minus one product shift, the sum of plus one product shift, and the sum of zero product shift. A timing error estimation unit capable of estimating timing error of the received signal based on the left cross-correlation point and the right cross-correlation point. A phase estimation unit capable of estimating common phase error of the received signal based on the sum of zero product shift. A correlation level estimation unit capable of calculating correlation level indicative of a correlation between the received signal and a reflection of the received signal ghost based on the center point.

56 Claims, 10 Drawing Sheets

OTHER PUBLICATIONS

Speth M., Fechtel S., Fock G., and Meyr H., "Optimum Receiver Design for OFDM-based Broadband Transmission—Part 2: A Case Study", IEEE, vol. 49, No. 4, Apr. 2001.

European Telecommunications Standards Institute (ETSI)—ETS 300 744, "Digital Video Broadcasting (DVB); Framing structure, channel coding and modulation for digital Terrestrial television (DVB-T)", Mar. 1997.

Richard Van Nee, Ramjee Prasad, "OFDM for wireless multimedia communications", 2000, Artech House Publishers.

* cited by examiner

SYSTEM AND METHOD FOR PRE-FFT OFDM FINE SYNCHRONIZATION

FIELD OF THE INVENTION

The present invention relates generally to orthogonal frequency division multiplexing (OFDM) systems and receivers, and more particularly, to a pre-Fast Fourier Transform (FFT) fine synchronization in OFDM receivers.

RELATED ART

| Patents | | |
|---|---|---|
| 5,652,772 | July 1997 | Isaksson, et al. |
| 5,771,224 | June 1998 | Seki et al |
| 5,838,734 | November 1998 | Wright |
| 5,867,532 | February 1999 | Ito et al. |
| 5,920,598 | July 1999 | Hyakudai et al. |
| 5,987,063 | November 1999 | Rinne |
| 6,058,121 | May 2000 | Kim, et al. |
| 6,137,847 | October 2000 | Stott, et al. |

OTHER REFERENCES

Speth M., Fechtel S., Fock G. and Meyr H., "Optimum Receiver Design for OFDM-based Broadband Transmission—Part 2: A Case Study", IEEE, Vol. 49, No. 4, April 2001.

European Telecommunications Standards Institute (ETSI—ETS 300 744, "Digital Video Broadcasting (DVB); Framing structure, channel coding and modulation for digital Terrestrial television (DVB-T)", March 1997.

Richard Van Nee and Ramjee Prasad, 2000, Artech House Publishers, ODFM for wireless multimedia communications.

BACKGROUND OF THE INVENTION

In recent years digital modulation systems were developed in the field of audio, video and data transmission. In digital worldwide broadcasting a common standard is the orthogonal frequency division multiplexing (OFDM) modulation system. The OFDM modulation systems are robust to multi-path interference. In the OFDM modulation system, a transmitted signal includes a large number of subcarriers, reflective of the OFDM mode. For example, in the DVB-T 2k OFDM mode the transmitted signal includes 1,705 subcarriers, while in the DVB-T 8k OFDM mode there are 6,817 subcarriers. The subcarriers are orthogonal to one another, and each is modulated with the digital data to be transmitted. Mathematically, orthogonality is a property of a set of functions such that the integral of the product of any two members of the set, taken over the appropriate interval, is zero. For example, trigonometric functions appearing in Fourier expansions are orthogonal functions.

Reference is now made to FIG. 1A where an illustration of an OFDM frame structure is shown. The transmitted signal in an OFDM modulation system is organized in frames. Each frame includes a constant number of symbols. Each symbol is constructed from multiple subcarriers. In FIG. 1B an illustration of a single symbol structure in the time domain is shown. A symbol includes two parts: a useful part (110) and guard interval part (120). The duration time (Ts) of the useful part is larger than that of the guard interval duration ($\Delta$). A guard interval does not form an integral part of the data to be sent by the transmitter but is rather "artificially" prepended to the useful part during preparation of data for transmission. The guard is therefore redundant and is, as a rule, identified and removed at the receiver end. The subcarriers in a symbol are placed in certain constant frequency intervals, and are represented as a complex number each having a different frequency. A symbol is represented as the sum of subcarriers from subcarrier 0 to subcarrier N−1.

Each symbol includes (in its useful and guard parts) data subcarriers and pilot subcarriers (shown, schematically, in FIG. 1B). As is known per se, pilots subcarriers are used for frame synchronization, time synchronization, frequency synchronization, and channel estimation. Additionally, pilots may be used for phase errors correction, as described, e.g. in "European Telecommunications Standards Institute (ETSI)—ETS 300 7444, "Digital Video Broadcasting (DVB); Framing structure, channel coding and modulation for digital Terrestrial television (DVB-T)", March 1997. Each symbol contains three different types of pilots: scattered, continual, and transmission parameters signaling (TPS). The pilots and the data sub-carriers are shown in the frequency domain in FIG. 1B as vertical arrow symbols (e.g. 130 and 140). Scattered pilots are spread equally in the symbol and between sets of symbols in a frame. For example, the scattered pilots' positions may be defined by using the equation k=(3*(l mod 4)+12*p) where l is the symbol number, k is the frequency slot position, and p is an arbitrary integer number. According to the equation, scattered pilots are inserted at intervals of twelve subcarriers. Scattered pilots of a symbol are shifted, e.g. by three positions relative to the immediately preceding symbol. According to the equation there are four sets of scattered pilots. Symbols further include a constant number of continual pilots, which are placed at fixed locations in each symbol. The number of continual pilots and their positions depends on the OFDM mode. The TPS pilots are used for the purpose of signaling parameters related to the transmission scheme, which is the channel coding and modulation. The TPS pilots may convey the following information: OFDM transmission mode, the value of the guard interval, frame number, and so on. Reference is now made to FIG. 2 where an exemplary block diagram of a hitherto known OFDM receiver 200 is shown (e.g., "Speth M., Fechtel S., Fock G. and Meyr H., "Optimum Receiver Design for OFDM-based Broadband Transmission—Part 2: A Case Study", IEEE, Vol. 49, No. 4, April 2001."). Receiver 200 is composed of the following units: analog front-end (AFE) 210, demodulator 220, guard removal unit 230, pre-FFT estimation unit 240, FFT unit 250, equalizer 260, and post-FFT estimation unit 270.

In operation, receiver 200 receives a modulated signal in the time domain, and transforms it to a demodulated signal in the frequency domain. The transformation is done using the fast Fourier transform (FFT) algorithm, and by means of FFT unit 250. AFE 210 converts the received signal from analog form to digital form. Additionally AFE 210 converts the received signal frequency from radio frequency (RF) to intermediate frequency (IF). Demodulator 220 converts the received signal frequency from IF frequency to base-band frequency. Additionally, Demodulator 220 corrects the sampling clock offset and the carrier frequency offset according to the feedback from the estimation units. Guard removal unit 230, is used for removal of the guard-interval portion (e.g. 120) from the received symbol, as well as for timing synchronization. Timing synchronization is the task of locating the beginning of a received OFDM symbol. The timing synchronization ensures a synchronized operation of the transmitter (not shown) and the receiver. In the case of, e.g., digital television system, proper synchronization will facilitate display of qualitative images at the subscriber's screen on the basis of processing the useful parts of the symbols (110 in FIG. 1B). In contrast, when failing to properly synchronize the transmitter and the receiver (i.e. the receiver fails to identify the beginning of the useful data part), the inevitable result is that certain part of the (redundant) data guard (120) is processed (as it is erroneously identified by the receiver as belonging to the useful part of the symbol) and, obviously, degraded quality of images are obtained and displayed. In order to accomplish timing synchronization, a timing error is calculated, i.e. the time difference between transmission and receipt of the useful part for a given symbol.

Post-FFT estimation unit 270 estimates the errors of timing synchronization, frequency synchronization, and sampling-clock synchronization, and performs channel estimation. Additionally, post-FFT estimation unit 270 provides a feedback to the relevant units with a correction signal. AFE 210 is provided with the sampling-clock error, demodulator 220 is provided with the frequency synchronization error, and guard removal 230 is provided with timing synchronization error. In order to provide a fast and reliable acquisition of information sent using OFDM, pre-FFT estimations are required. However, the pre-FTT estimations provide only coarse estimation for timing and frequency synchronizations. The coarse pre-FFT estimations are performed by pre-FFT estimation unit 240. One of receiver 200 tasks is to recognize ghost symbols. A ghost symbol is the reflection of the transmitted signal on various obstacles found in a broadcast environment.

Known implementations of pre-FFT synchronization algorithms provide only coarse estimation of fine synchronization. This has significant shortcomings, e.g. an inaccurate estimation of, say, the timing error and deferring the accurate determination thereof (and the subsequent timing synchronization) to the later (and slower) post FFT unit(s).

Additionally, hitherto known pre-FFT algorithms are not capable of detecting a common phase error (CPE) in the received signal at time domain.

SUMMARY OF THE INVENTION

The invention provides for a synchronization unit for performing fine synchronization in the Time Domain, the synchronization unit comprises:

storage configured to store reference signals;

a multiplier capable of calculating sum of zero product shift, sum of minus one product shift, and sum of plus one product shift, based on at least said reference signals;

a signal analyzer capable of computing left, center, and right cross-correlation points based on said sum of minus one product shift, said sum of plus one product shift, and said sum of zero product shift;

a timing error estimation unit capable of estimating timing error of said received signal based on said left cross-correlation point and said right cross-correlation point;

a phase estimation unit capable of estimating common phase error of said received signal based on said sum of zero product shift;

a correlation level estimation unit capable of calculating correlation level indicative of at least a correlation between said received signal and a reflection of said received signal ghost thereof based on said center point.

The invention further provides for a method for estimating common phase error of a received signal, comprising:
a) calculating the sum of zero product shift; and
b) computing the common phase error on the basis of said sum of zero product shift.

Yet further, the invention provides for a method for estimating timing error of a received signal, comprising:
a) calculating sum of plus one product shift and sum of minus one product shift;
b) calculating left and the right cross-correlation points, based on said sum of plus one product shift and sum of minus one product shift;
c) estimating said timing error based on said left and the right cross-correlation points.

Still further, the invention provides for a method for estimating a correlation level indicative of at least correlation between received signal and a ghost thereof, comprising:
a) calculating a sum of zero product;
b) calculating the center cross-correlation point based on said sum of zero product;

The invention provides for a synchronization unit for performing phase error synchronization in the time domain, the synchronization unit comprises:

a storage for digitally storing at least a reference signal;

a multiplier capable of calculating the sum of zero product shift based on at least said reference signals;

a phase estimation unit capable of computing the common phase error of a received signal based on said sum of zero product shift.

The invention further provides for a synchronization unit for performing timing synchronization in the time domain, the synchronization unit comprises:

a storage for digitally storing at least a reference signal;

a multiplier capable of calculating the sum of minus one product shift and the sum of plus one product shift, based on at least said reference signal;

a signal analyzer capable of calculating left and right cross-correlation points based on said minus one product shift and said sum of plus one product shift;

a timing error estimation unit capable of estimating the timing error of a received signal based on said left cross-correlation point and said right cross-correlation point.

Still further, the invention provides for a synchronization unit for estimating the correlation level indicative of at least correlation between received signal and a ghost thereof, the synchronization unit comprises:

a storage for digitally storing at least a reference signal;

a multiplier capable of calculating the sum of zero product shift;

a signal analyzer capable of calculating center cross-correlation point based on said zero product shift;

a correlation level estimation unit capable of calculating the correlation of a received signal and a ghost thereof based on said center point.

Yet further, the invention provides for a receiver that includes a synchronization unit for performing fine synchronization of a received signal, comprising:

a processor configured to process the received signal in the time domain for obtaining at least one of the following: estimated timing error, estimated common phase error and calculated correlation level indicative of a correlation between said received signal and a ghost thereof based on said center point.

The invention provides for a receiver fitted in a digital television system for receiving a broadcast signal from a television transmitting system, comprising:

the received broadcast signal includes data indicative of a succession of frames for processing and displaying the processed frames on a screen of said television system; and wherein said receiver is configured to obtain, in the time domain, at least a timing error and correlation level for rapid synchronization of the received signal to the broadcast signal and rapid removal of ghosts incorporated in said received signal, whereby frames of high quality are displayed on said screen at substantially less delay as compared to the delay in displaying said frames had the timing error been obtained in the frequency domain.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The invention provides a system and method for performing accurate timing synchronization, filtering ghost signal through the calculation of correlation level, and detecting phase error in at least orthogonal frequency division multiplexing (OFDM) transmission.

Figure 3:
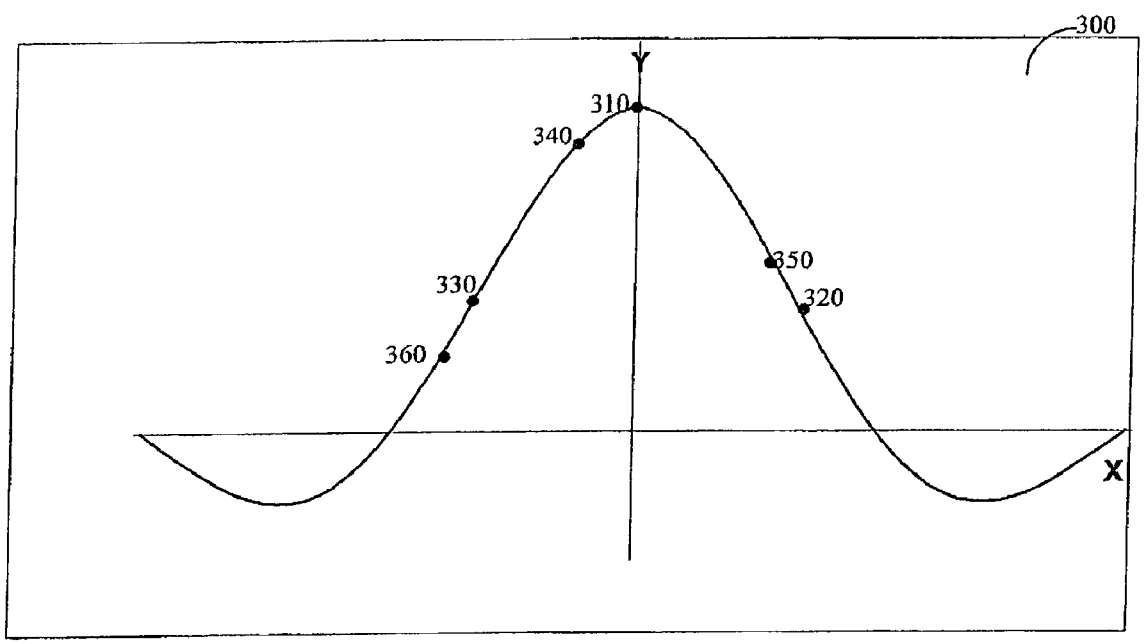
FIG. 3—is an illustration of a symmetric waveform, in accordance with one embodiment of the invention.

By one embodiment, these activities are performed in the time domain, before executing the fast Fourier transform (FFT) algorithm. By this embodiment, based on the characteristics that pilots within a transmitted OFDM symbol are placed at known frequency intervals and further based on the orthogonal characteristics of the transmitted subcarriers (including data sub-carriers and pilots), a symmetric waveform (300) is produced. An exemplary symmetric waveform (i.e. SINC waveform represented also as sin(x)/x) is shown in FIG. 3. As will be explained in greater detail below, the symmetric characteristics of the signal can be used for estimating the sought timing errors phase errors, and correlation level. Note that certain aspects of the present invention concern scattered and continual pilots.

Figure 1A:
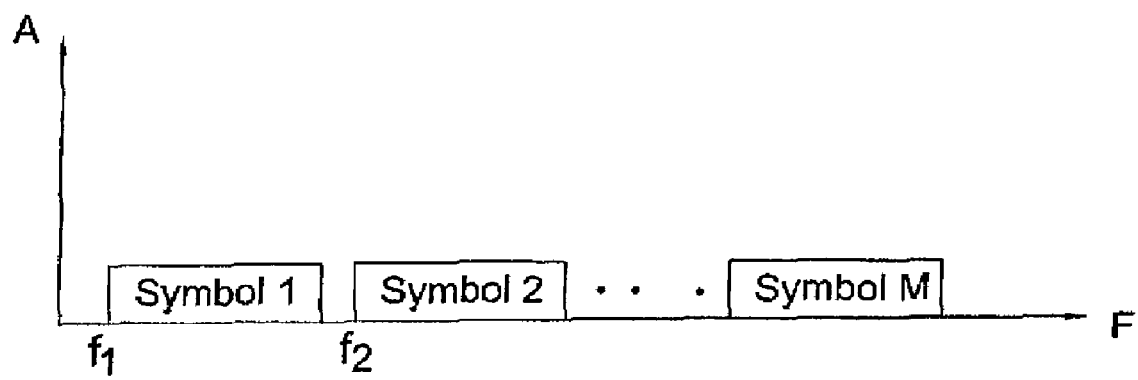
FIG. 1—is a schematic illustration of OFDM frame structure.
Figure 1B:
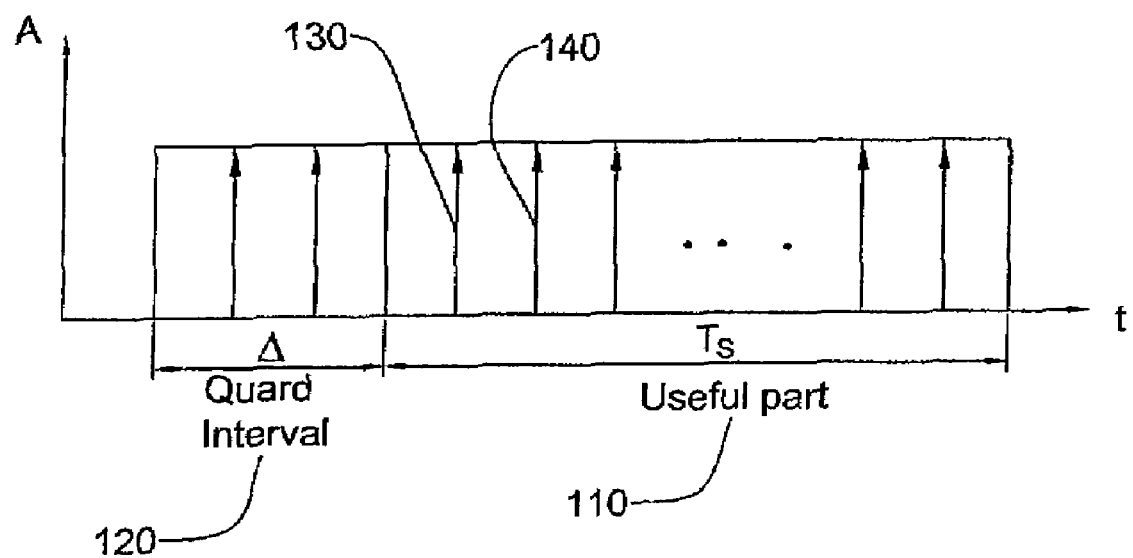
Figure 2:
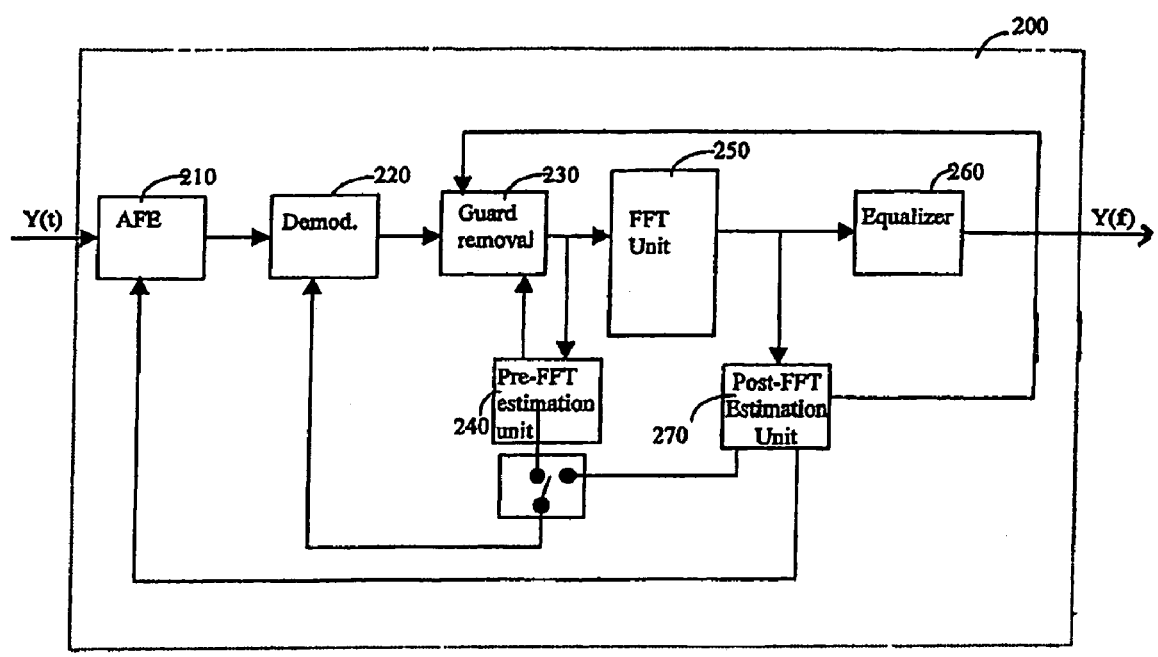
FIG. 2—is an exemplary block diagram of OFDM receiver in accordance with the prior art.
Figure 4:
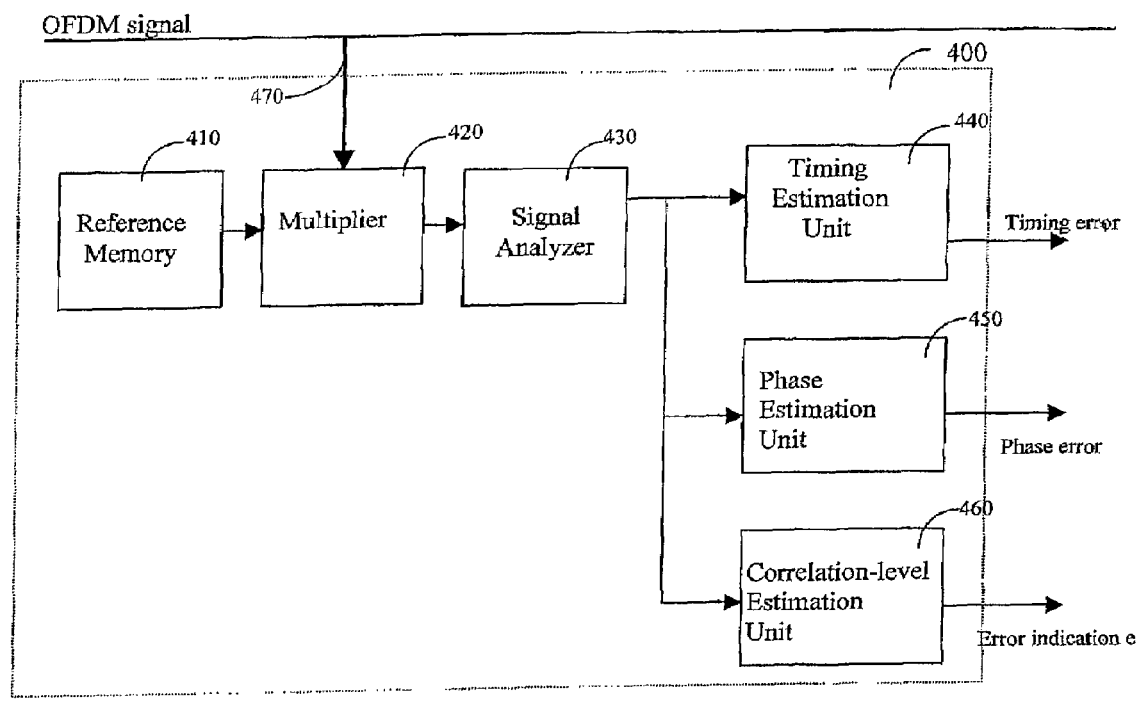
FIG. 4—is an exemplary block diagram of pre-FFT estimation unit, in accordance with an embodiment of the invention.

Reference is now made to FIG. 4 where there is shown a block diagram of a synchronization unit (SU) 400 for pre-FFT synchronization in accordance with one embodiment of the invention. By one embodiment the SU is incorporated in module 240 (discussed with reference to FIG. 2). The invention is not bound by this architecture and any implementation for estimating one or more of timing error, phase error and correlation level at time domain is embraced by the invention.

Reverting to the embodiment of FIG. 4, SU 400 improves the hitherto known pre-FFT estimations, e.g. unit 240, which is described in the prior art. Comparing, for example, to pre-FFT estimation unit 240, SU 400 provides finer synchronization (due to accurate estimation of timing error) and common phase error (CPE) estimation. The latter has not been determined in the pre-FFT computations according to the prior art.

By this embodiment, SU 400 is composed of reference memory 410, multiplier 420, signal analyzer 430, timing estimation unit 440, phase estimation unit 450, and correlation-level estimation unit 460. SU 400 obtains a demodulated OFDM signal through line 470 (delivered, by this embodiment from module 230 of FIG. 2), and produces signal estimations of timing error, phase error, and calculation of correlation level. The correlation level includes information about the correlation between the data in the received symbol and the reference signals. The correlation level is further processed (as discussed in detail below) mainly for enabling synchronization to the current scattered set and for identifying and eliminating ghosts from the symbol. Reference memory 410 is pre-loaded with reference signals, typically pilot reference signals (hereinafter "PRS"), which by this embodiment are the inverse fast Fourier transform (IFFT) of the pilots. By this embodiment, the reference signals may be the IFFT of the scattered pilots, continual pilots, or the sum of the scattered pilots and the continual pilots. Reference memory 410 may be, read only memory (ROM), erasable programmable read only memory (EPROM), Flash memory, or any other type of read only memory. It is further possible to use volatile memory for this purpose provided that such memory is loaded at initialization with the PRS.

By this embodiment, multiplier 420 performs a complex number multiplication between a reference signal obtained from reference memory 410 and a demodulated OFDM symbol. The multiplication procedure is further detailed below. By this embodiment, signal analyzer 430 calculates three points of the cross-correlation square magnitude, based on the signal coming from multiplier 420. As can be seen in FIG. 3, the three points are identified: center 310, right 320, and left 330. If the center point of the received signal is found to be where center point 310 is shown then the system is synchronized with the current scattered set.

By one embodiment, and as will be explained in greater detail below, timing synchronization error is estimated based on the position of the right and left cross-correlation points of the received signal as compared to the respective right 320 and left 330. The timing synchronization error is proportional to the difference between the left 330 and right 320 points. The timing synchronization is calculated by timing estimation unit 440.

By this embodiment, and as will be explained in greater detail below, phase estimation unit 450 estimates the phase error signal. Phase error signal is obtained from angle of the complex number representation of the center point.

By this embodiment, and as will be explained in greater detail below, correlation-level estimation unit 460 computes the correlation level signal of the transmitted symbol. The correlation level signal is used to synchronize the received symbol to the current scattered set. Further the correlation level may be used to determine if the receiver is synchronized to a real symbol, or to a ghost symbol.

The invention is not bound by either the system architecture of FIG. 4 or by its functionality. For example, by another non-limiting embodiment, only one (or two) of the specified timing error, phase error and correlation level value are calculated, all as required and appropriate, depending upon the particular application.

Figure 5:
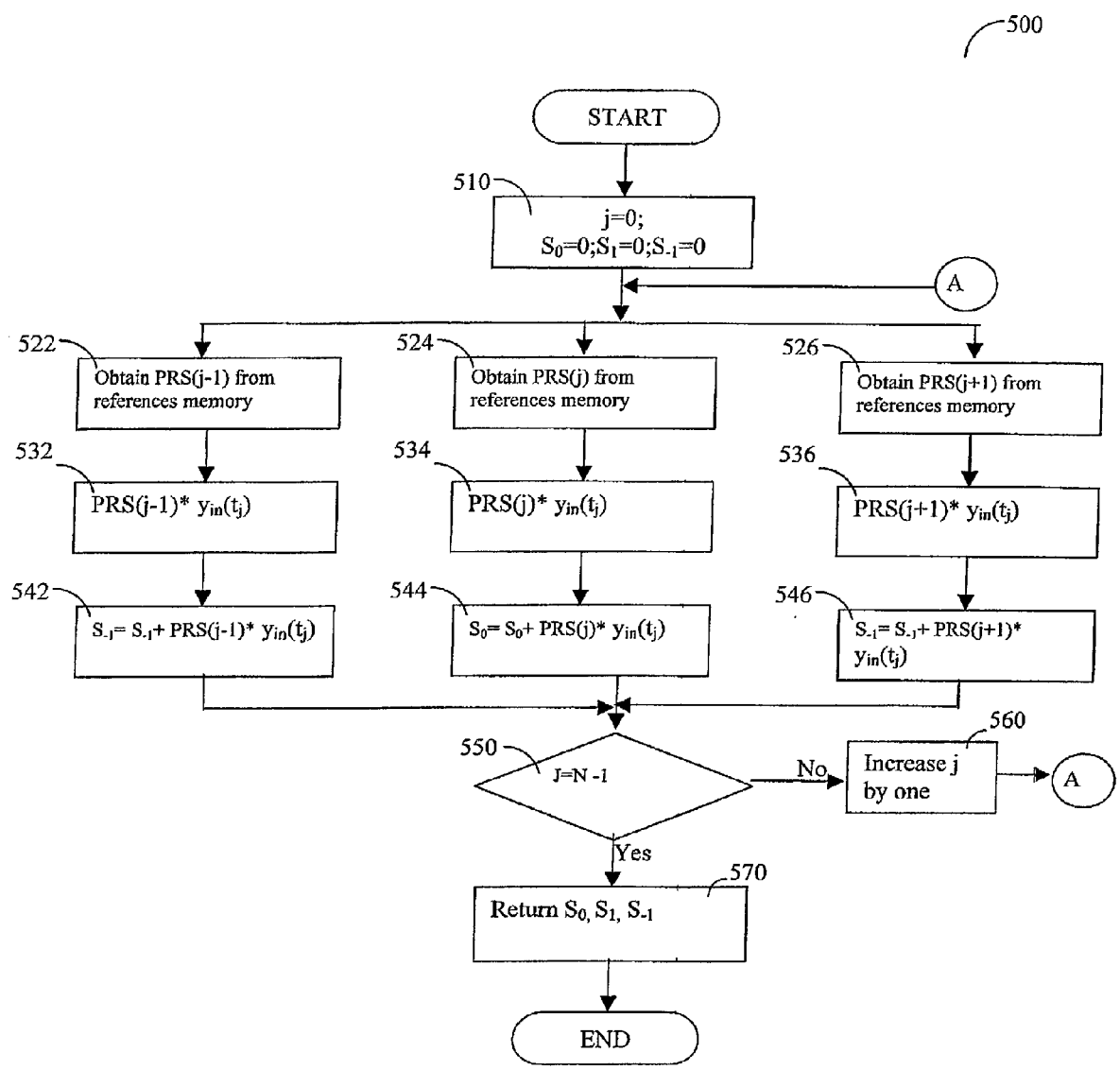
FIG. 5—is a flow chart illustrating a multiplying procedure, in accordance with an embodiment of the invention.

Reference is now made to FIG. 5 where an embodiment of the multiplication procedure 500 is shown. By this embodiment, multiplier 420 multiplies between PRS and a sample of the received signal $y_{in}(t_j)$. In each iteration multiplier 420 multiplies in parallel three PRS signals with a corresponding $y_{in}(t_j)$ sample, i.e., $PRS(j)* y_{in}(t_j)$, $PRS(j-1)* y_{in}(t_j)$, and $PRS(j+1)*y_{in}(t_j)$. In step 510 the variable "j", as well as the summation variables $S_0$, $S_1$, and $S_{+1}$ are all set to zero. Here "j" represents the current index of the PRS, starting from zero and ending at N−1, where "N" is the total number of signals in reference memory 410. $y_{in}(t_0)$ is the first sample signal after the guard part. In steps 522, 524, and 526, multiplier 420 obtains $PRS(j-1)$, $PRS(j)$, and $PRS(j+1)$ signals respectively from reference memory 410. In steps 532, 534 and 536, multiplier 420 multiplies each of $PRS(j-1)$, $PRS(j)$ and $PRS(j+1)$ with $y_{in}(t_j)$. A complex product between two complex numbers results in a complex number. For example, if the first number equals $A*e^{ia}$, and the second number equals $B* e^{ib}$, then the complex product is the complex number $A*B*e^{i(a+b)}$. In step 542, multiplier 420 adds the product of $y_{in}(t_j)*PRS(j-1)$ to the previous sum of calculated products. In step 544, multiplier 420 adds the product of $y_{in}(t_j)*PRS(j)$ to the previous sum of calculated products. In step 546, multiplier 420 adds the product of $y_{in}(t_j)*PRS(j+1)$ to the previous sum of calculated products. In step 550, multiplier 420 checks if the current index, i.e., "j", equals "N−1". In the case where the current index "j" is not equal to "N−1" then, "j" is increased by one in step 560 and the procedure is repeated for the newly updated "j". In the case where "j" equals "N−1" then, in step 570 procedure 500 returns the sums $S_0$, $S_1$, and $S_{-1}$. Here $S_0$, $S_1$, and $S_{-1}$ correspond to zero, plus one, and minus one product shifts. The terms zero, minus one, and plus one product shifts refer to the multiplications of $y_{in}(t_j)*PRS(j)$, $y_{in}(t_j)*PRS(j-1)$, $y_{in}(t_j)*PRS(j+1)$ respectively. It should be noted that in the case where j=0 the multiplier 420 multiplies between $y_{in}(t_j)$ and $PRS(j-1)$ (i.e. $PRS(-1)$, which does not exist and therefore not stored in the memory) by obtaining a PRS signal identical to $PRS(j-1)$ say, for example, $PRS(j-1+N)$ which is stored in the memory. Similarly, when j=N−1 multiplier 420 multiplies between $y_{in}(t_j)$ and $PRS(j+1)$ by obtaining a PRS signal identical to $PRS(j+1)$. This ability (i.e. selecting identical PRSs) is a based on the pilots' characteristic as discussed above.

The invention is not bound by using a multiplier and in the case that a multiplier is used the invention is not bound by using the multiplier described above with reference to FIG. 5. Thus, in accordance with another non-limiting embodiment the multiplications are performed by multiplying each of $y_{in}(t_j)$, $y_{in}(t_{j-1})$, and $y_{in}(t_{j+1})$ with $PRS(j)$.

Note that the multiplier may be realized in software, hardware or combination thereof, all as required and appropriate.

Figure 6:
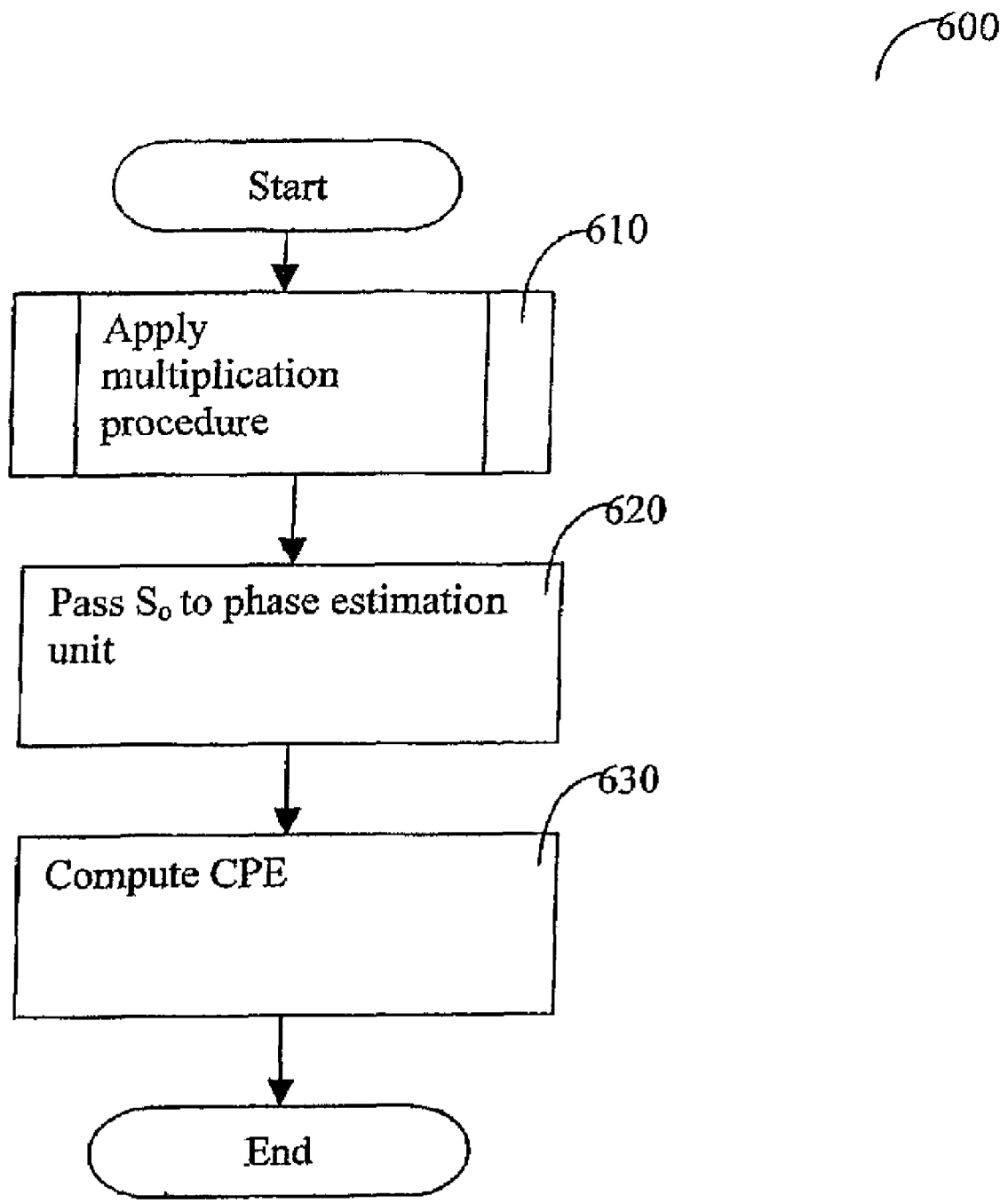
FIG. 6—is a flow chart illustrating the process of estimating the phase error, in accordance with an embodiment of the invention.

Attention is now directed to FIG. 6 showing one embodiment of flowchart 600 for computing the CPE. In step 610, multiplier 420 computes the values of the zero, plus one, and minus one product shifts, all as described above with reference to FIG. 5. Each product shift results in a complex number, which includes an imaginary component and a real component. In step 620, signal analyzer 430 passes the value of the zero product shift, i.e., $S_0$, to phase estimation error unit 450. In step 630, phase estimation unit 450 computes the CPE. The CPE is equal to the angle of the complex number represented by $S_0$ (and obtained e.g., by applying $\tan^{-1}$ between the complex number components, or—as will be exemplified below, by obtaining the angle of the complex number if it is represented using Euler equations. Note that extraction of the value of the angle from a complex number is well known in the art).

Consider, for example, the value of $S_0$ calculated by multiplier 420 is $S_0=1.5e^{i\pi/7}$. The angle of the complex number $S_0$ is the number raised to a power "e", i.e., equal to $\pi/7$. Hence, the CPE is equal to $\pi/7$. Had the value of the angle been, for example, equal to zero, then CPE is equal to zero.

Using the CPE, SU 400 produces phase error signal. The phase error signal is sent to, say, a known per se phase controller that is used to eliminate the CPE.

Figure 7A:
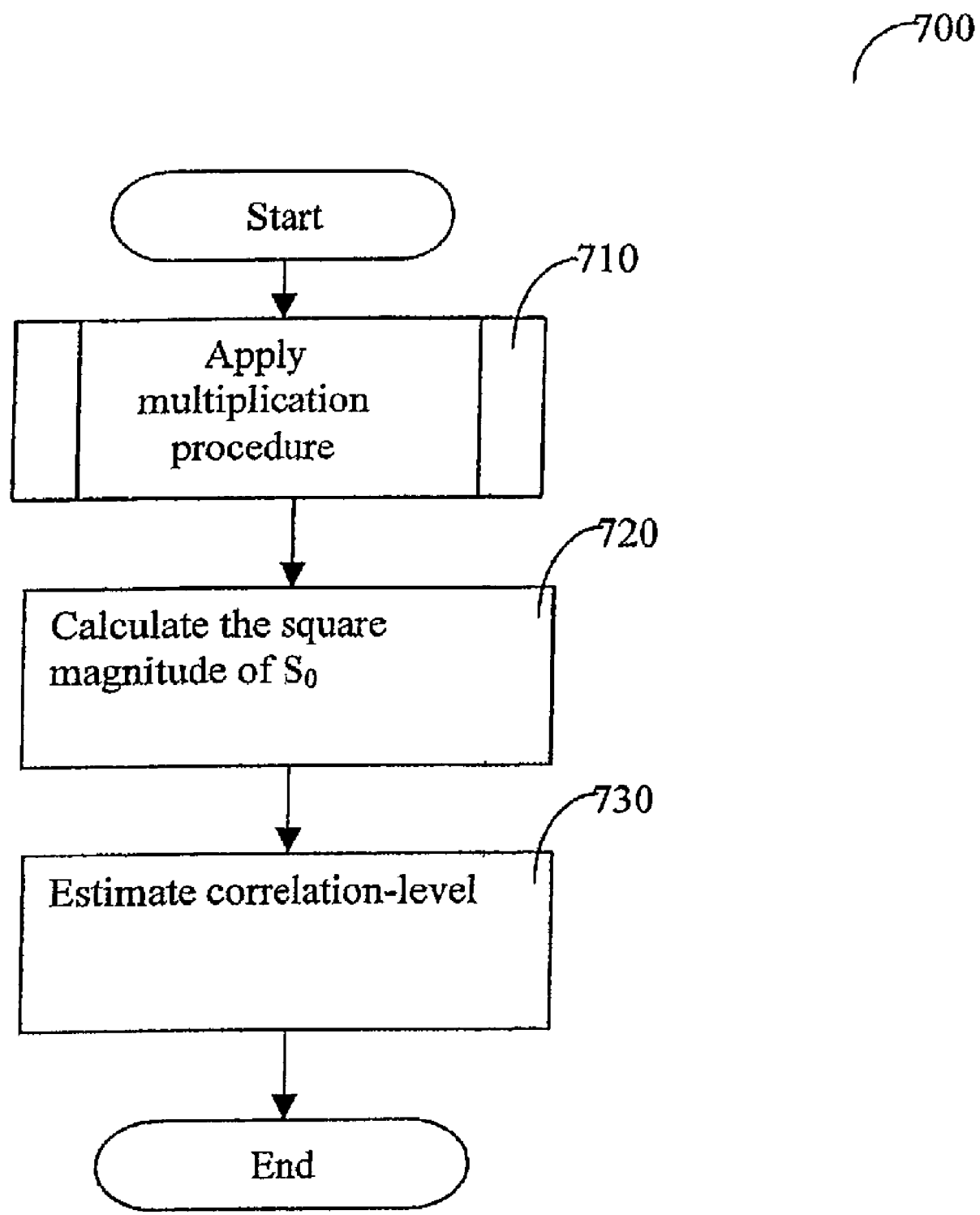
FIG. 7A—is a flow chart illustrating the process of estimating the correlation level, in accordance with an embodiment of the invention.

Attention is now directed to FIG. 7A, showing one embodiment of flowchart 700 for computing the correlation level. The correlation level after being subject to further processing (as will be described in greater detail below) enables to determine, inter alia if the receiver is synchronized to the current scattered pilots set, and if the receiver is synchronized to an actual symbol. This will enable to determine whether the received symbol includes a ghost component and, if in the affirmative, enabling removal thereof. In step 710, multiplier 420 computes the values of the zero, plus one, and minus one product shifts, all as described above with reference to FIG. 5. Of course, if these values are already available (e.g., as a result of calculating, in accordance with one embodiment, of phase error), the latter calculation is obviated. By this embodiment, each product shift value results in a complex number that includes an imaginary component and a real component. Assuming that the exemplary symmetric waveform of the kind described with reference to FIG. 3 is utilized, in step 720 signal analyzer 430 calculates a single cross-correlation point, central 310, for each received symbol. Point 310 is the square magnitude of the zero $S_0$ product shift calculated, e.g. by multiplier 420 described above. For example, if the complex number computed by multiplier 420 is equal to $A*e^{ia}$, wherein "A" is the magnitude and "$e^{ia}$" represents the phase. Hence, the square magnitude of this number is equal to $A^2$. It should be noted that the square magnitude is a real number. In step 730, correlation-level estimation unit 460 obtains the central point's value from the signal analyzer 430, and computes the correlation level. Correlation-level estimation unit 460 computes the correlation level by calculating the magnitude value of central point 310.

Figure 7B:
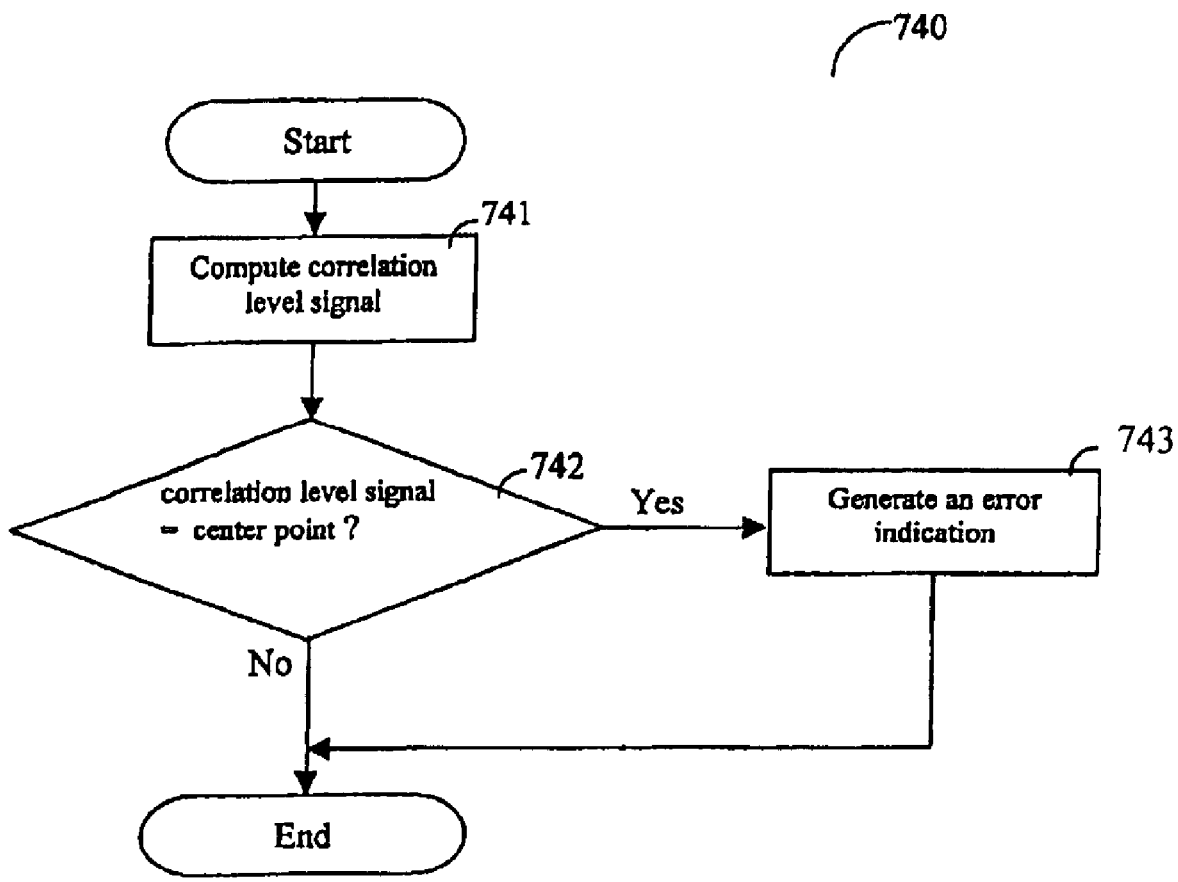
FIG. 7B—illustrates how to determine if a received symbol is synchronized with current scattered pilots set, in accordance with one embodiment of the invention.

Attention is now directed to FIG. 7B, showing one embodiment of flowchart 740 used for determining whether received symbols are synchronized to the current scattered pilots set. The determination is done based on the correlation level signal and by means of correlation-level estimation 460.

As mentioned above, the scattered pilots are spread equally in the symbol and between sets in frame. A symbol is considered correlated if its scattered pilots set is as expected by OFDM receiver 200. The scattered pilots include information essential for the symbol processing. Hence, receiver 200 must be synchronized with the corresponding scattered set. In step 741, the correlation level is computed using the process described above. In step 742, the correlation level is compared with the value of the expected center point 310.

If the computed correlation level is lower than the expected position 310, then is considered as uncorrelated. If it is determined that the received symbol is uncorrelated, then in step 743, a correlation error indication is generated. The correlation error indication is sent to a timing controller located, e.g. in guard removal 230. As can be seen in FIG. 3 the original central point 310, is compared to the shifted point located, for example, at point 340.

The use of the correlation level for synchronizing to the current scattered pilots set is exemplified below. Thus, if the value of $S_0$ calculated by multiplier 420 is $S_0 = 1.5e^{i\pi/7}$.

The square magnitude of $S_0$ is equal to $(1.5)^2 = 2.25$. Correlation-level estimation unit 460 compares this value to the expected value of central point 310 (normally, between 0.7 to 1.3). If the square magnitude value is lower than the value of central point 310, then SU 400 produces a correlation error indication. The correlation error indication is sent to a timing controller located, e.g. in guard-removal 230. The timing controller, based on the error indication, tries to synchronize the received symbol to current scattered pilots set, e.g., by changing the sampling rate.

Figure 7C:
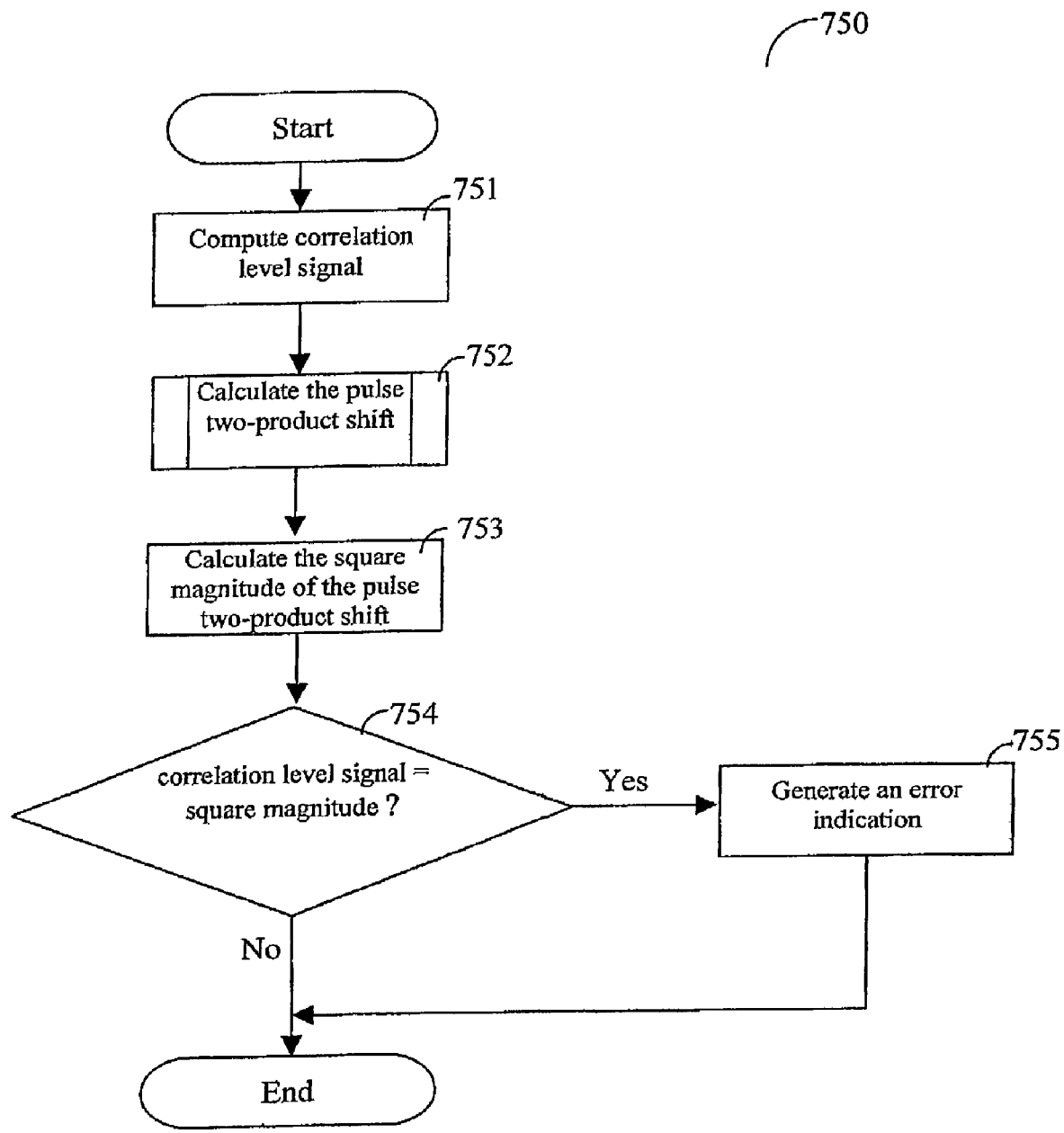
FIG. 7C illustrates how to determine if a received symbol includes ghost component, in accordance with one embodiment of the invention.

Attention is now directed to FIG. 7C showing one embodiment of flowchart 750 used for determining whether received symbols are synchronized with the actual signal, i.e. whether the received symbol is a ghost symbol or includes a ghost component. The determination is based on the correlation level. In step 751, the correlation level signal is computed using the process described above. In step 752, the value of a plus two-product shift is computed, i.e. computing the product of $PRS(j)^* y_{in}(t_{j+2})$ for j starting from zero and ending at N−1. The value of the plus two-product shift is computed by means of multiplier 420. In step 753, signal analyzer calculates the square magnitude of the plus two-product shift. In step 754, the value of the square magnitude is compared with the correlation level computed in step 751. If the comparison result indicates equality between both signals, then in step 755, correlation-level estimation unit 460 generates a ghost error indication. The ghost error indication indicates that the received symbol is a ghost symbol or includes a ghost component. This indication instructs receiver 200 to disregard the received symbol.

The use of the correlation level for detecting ghost symbols is exemplified below. If the correlation level signal computed by correlation level estimation unit 460 is 2.25 and the value of the plus two-product shift is $S_{+2} = 2.5e^{i\pi/7}$. Thus, the square magnitude of $S_{+2} = 6.25$.

In this case the received symbol dose not include ghost component, since the square magnitude of $S_{+}2$ (i.e. 2.25) is not equal to the value of the correlation level (i.e. 6.25). Had the square magnitude being equal or substantially equal to 6.25 it would have suggested that there is a ghost component that needs to be removed.

Figure 8:
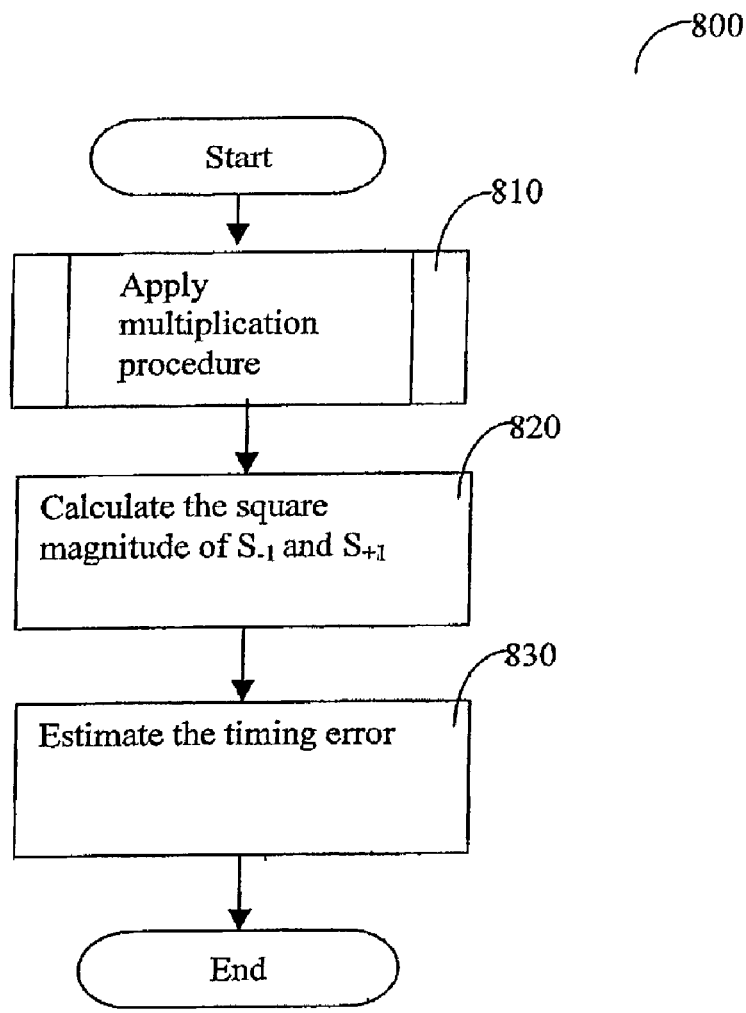
FIG. 8—is a flow chart illustrating the process of estimating the timing error, in accordance with an embodiment of the invention.

Attention is now directed to FIG. 8 showing one embodiment of flowchart 800, illustrating the method for computing the timing error signal. In step 810, multiplier 420 computes the values of the zero, plus one, and minus one product shifts ($S_0$, $S_1$ and $S_{-1}$, respectively). If these values are already available from previous calculations (e.g. from the correlation level and/or phase error estimations discussed above), the need to calculate them again is of course obviated. Each product shift value results in a complex number, which includes an imaginary component and a real component. In step 820, signal analyzer 430 calculates two cross-correlation points, right 320, and left 330, for each symbol. The right point 320 and left point 330 are respectively the square magnitude of plus one $S_1$, and minus one $S_{-1}$ product shifts.

For example, if the complex number computed by multiplier 420 is equal to $A^* e^{i\alpha}$, wherein "A" represents the magnitude and "$e^{i\alpha}$" represent the phase part. Hence, the square magnitude of this number is equal to $A^2$. It should be noted that the square magnitude is a real number. In step 830, timing estimation unit 450, estimates the timing error.

A timing error results, by this embodiment, in an offset of the two side points from their original positions, namely side points 320 and 330 in FIG. 3. In contrast, a received symbol may have an offset relative to these points shown, for example, as points 350 and 360 of FIG. 3. Timing estimation unit 450, computes the estimated timing error by calculating the difference between the magnitudes of points 350 and 360.

For example, if the value of $S_{-1}$ and $S_1$ calculated by multiplier 420 are $S_{-1} = 0.5e^{i\pi/7}$ and $S_1 = 1.5e^{i\pi/4}$. Thus, the square magnitude of $S_{-1}$ is equal to $(0.5) = 0.25$ and the square magnitude of $S_1$ is equal to $(1.5)^2 = 2.25$. Timing estimation unit 440 computes the difference between these two values, which results in the timing error. Here, the timing error is equal to 2.25−0.25=2. The timing error is sent to a timing controller in guard-removal 230. The timing controller, using the timing error, tries to synchronize to the beginning of the received symbol, for example, by changing the sampling rate. A lower value of timing error indicates that guard removal 230 is synchronized to the beginning of the received signal, namely, guard removal 230 removes only guard interval 120 from the received symbol.

Note that the calculation of the phase error, timing error and correlation level are not necessarily implemented in any particular order and if desired they may be performed partially or wholly in parallel. As explained above, in certain embodiments, not all the specified values (time error, phase error and correlation level) are required.

The implementation of the various embodiments of the invention may be in hardware, software or combination thereof, all as required and appropriate.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. The invention has been described with a certain degree of particularity, but those versed in the art will readily appreciate that various alterations and modifications may be carried out without departing from the scope of the following claims:

The invention claimed is:

1. A synchronization unit for performing fine synchronization in the Time Domain, the synchronization unit comprises:
   storage configured to store reference signals;
   a multiplier capable of calculating sum of zero product shift, sum of minus one product shift, and sum of plus one product shift, based on at least said reference signals and a received signal;

a signal analyzer capable of computing left, center, and right cross-correlation points based on said sum of minus one product shift, said sum of plus one product shift, and said sum of zero product shift;

a timing error estimation unit capable of estimating timing error of said received signal based on said left cross-correlation point and said right cross-correlation point;

a phase estimation unit capable of estimating common phase error of said received signal based on said sum of zero product shift;

a correlation level estimation unit capable of calculating correlation level indicative of at least a correlation between said received signal and a ghost thereof based on said center point.

2. The synchronization unit of claim 1, wherein said reference memory is at least one of: read only memory (ROM), erasable programmable memory read only memory (EPROM), Flash memory.

3. The synchronization unit of claim 1, wherein calculation said sum of zero product shift, sum of minus one product shift, and sum of plus one product shift is performed on a sample of received signal with a respective zero, minus one and plus one reference signals.

4. The synchronization unit of claim 1, wherein said multiplier is capable of calculating said sum of zero product shift including the following:
a) initializing a first index variable and a first summation variable;
b) sampling said received signal;
c) obtaining a first reference from said storage;
d) adding to said first summation variable the result of a complex number multiplication of said first reference with said received signal;
e) comparing said first index variable to the number of reference signals in said storage;
f) if said comparison result indicates inequality between any of said compared reference signals and said first index variable, then repeating said b) through f).

5. The synchronization unit of claim 4, wherein said received signal is a sampled signal of an orthogonal frequency division multiplexing (OFDM) demodulated signal.

6. The synchronization unit of claim 4, wherein said first index variable is initialized to the value zero.

7. The synchronization unit of claim 4, wherein said first summation variable is initialized to the value zero.

8. The synchronization unit of claim 4, wherein said first reference contains the data of a reference signal pointed to by said first index variable.

9. The synchronization unit of claim 4, wherein said multiplier is capable of calculating said sum of minus one product shift including the following:
a) initializing a second index variable and a second summation variable;
b) sampling said received signal;
c) obtaining a second reference from said storage;
d) adding to said second summation variable the result of a complex number multiplication of said second reference with said received signal;
e) comparing the second index variable to the number of reference signals in said storage;
f) if said comparison result indicates inequality between any of said compared reference signals and the second index variable then repeating said b) through, f).

10. The synchronization unit of claim 9, wherein said received signal is a sampled signal of an orthogonal frequency division multiplexing (OFDM) demodulated signal.

11. The synchronization unit of claim 9, wherein said second index variable is initialized to the value zero.

12. The synchronization unit of claim 9, wherein said second summation variable is initialized to the value zero.

13. The synchronization unit of claim 9, wherein said second reference contains the data of a reference signal location immediately previous to the reference signal pointed to by said second index variable minus one.

14. The synchronization unit of claim 9, wherein said multiplier is capable of calculating said sum of plus one product shift including the following:
a) initializing a third index variable and a third summation variable;
b) sampling the received signal;
c) obtaining a third reference from said storage;
d) adding to said third summation variable the result of a complex number multiplication of third reference with said received signal;
e) comparing the third index variable to the number of reference signals in said storage;
f) if said comparison result indicates inequality between any of said compared reference signals and the third index variable, then repeating operations b) through f).

15. The synchronization unit of claim 14, wherein said received signal is a sampled signal of an orthogonal frequency division multiplexing (OFDM) demodulated signal.

16. The synchronization unit of claim 14, wherein said third index variable is initialized to the value zero.

17. The synchronization unit of claim 14, wherein said third summation variable is initialized to the value zero.

18. The synchronization unit of claim 14, wherein said third reference contains the data of a reference signal location immediately next to the reference signal pointed to by said third index variable plus one.

19. The synchronization unit of claim 1, wherein calculation said sum of zero product shift, sum of minus one product shift, and sum of plus one product shift is performed on a reference signal with a respective zero, minus one and plus one sampled signals.

20. The synchronization unit of claim 1, wherein said signal analyzer is capable of calculating said left cross-correlation point by calculating a square magnitude of said sum of minus one product shift.

21. The synchronization unit of claim 20, wherein said square magnitude is a square value of a real component of said sum of minus one product shift.

22. The synchronization unit of claim 1, wherein said signal analyzer is capable of calculating said center cross-correlation point by calculating a square magnitude of said sum of zero product shift.

23. The synchronization unit of claim 22, wherein said square magnitude is a square value of a real component of said sum of zero product shift.

24. The synchronization unit of claim 1, wherein said signal analyzer is capable of calculating said right cross-correlation point by calculating a square magnitude of said sum of plus one product shift.

25. The synchronization unit of claim 24, wherein said square magnitude is a square value of a real component of said sum of plus one product shift.

26. The synchronization unit of claim 1, wherein said phase estimation unit is capable of estimating said common phase error comprises by calculating an angle of the complex number represented by said sum of zero product shift.

27. The synchronization unit of claim 1, wherein said timing error estimation unit is capable estimating said timing error by calculating a difference between values levels of said left point and said right point.

28. The synchronization unit of claim 22, wherein said correlation level is equal to the magnitude of said center point.

29. A method for estimating common phase error of a received signal, comprising:
  calculating a sum of zero product shift; and
  computing the common phase error on the basis of said sum of zero product shift;
  wherein calculating said sum of zero product shift comprises the following:
    a) initializing an index variable and a first summation variable;
    b) sampling said received signal;
    c) obtaining a first reference from said storage;
    d) adding to said first summation variable the result of a complex number multiplication of first reference with said received signal;
    e) comparing the index variable to the number of reference signals in said storage;
    f) if said comparison result indicates inequality then repeating operations b) through f).

30. The method of claim 29, wherein said index variable is initialized to the value zero.

31. The method of claim 29, wherein said first summation variable is initialized to the value zero.

32. The method of claim 29, wherein said first reference contains the data of a reference signal pointed to by the index variable.

33. The method of claim 29, wherein said received signal is a sampled signal of an orthogonal frequency division multiplexing (OFDM) demodulated signal.

34. The method of claim 29, wherein said common phase error is equal to an angle of a complex number represented by said sum of zero product shift.

35. A computer readable medium storing computer executable code for performing the method of claim 29.

36. A method for estimating timing error of a received signal, comprising:
  calculating a sum of plus one product shift and a sum of minus one product shift;
  calculating left and the right cross-correlation points, based on said sum of plus one product shift and said sum of minus one product shift; and
  estimating said timing error based on said left and the right cross-correlation points;
  wherein calculating said sum of minus one product shift comprises the following:
    a) initializing a first index variable and a first summation variable;
    b) sampling said received signal;
    c) obtaining a first reference from storage;
    d) adding to said first summation variable the result of a complex number multiplication of said first reference with said received signal;
    e) comparing said first index variable to the number of reference signals in said storage;
    f) if said comparison result indicates inequality then repeating operations b) through f).

37. The method of claim 36, wherein said first index variable is initialized to the value zero.

38. The method of claim 36, wherein said first summation variable is initialized to the value zero.

39. The method of claim 36, wherein said first reference contains the data of a reference signal location immediately previous to the reference signal pointed to by said first index variable minus one.

40. The method of claim 36, wherein said received signal is a sampled of an orthogonal frequency division multiplexing (OFDM) demodulated signal.

41. The method of claim 36, wherein calculating said sum of plus one product shift comprising the following:
  a) initializing a second index variable and a second summation variable;
  b) sampling said received signal;
  c) obtaining a second reference from said storage;
  d) adding to said second summation variable to the result of a complex number multiplication of said second reference with said received signal;
  e) comparing the second index variable to the number of reference signals in said storage; and
  f) if said comparison result indicates inequality then repeating operations b) through f).

42. The method of claim 41, wherein said second index variable is initialized to the value zero.

43. The method of claim 41, wherein said second summation variable is initialized to the value zero.

44. The method unit of claim 41, wherein said second reference contains the data of a reference signal location immediately next to the reference signal pointed to by said second index variable plus one.

45. The method of claim 41, wherein said received signal is a sampled of an orthogonal frequency division multiplexing (OFDM) demodulated signal.

46. The method of claim 36, wherein calculating said left cross-correlation point includes computing a square magnitude of said sum of minus one product shift.

47. The method of claim 36, wherein calculating said right cross-correlation point includes computing a square magnitude of said sum of plus one product shift.

48. The method of claim 47, wherein computing said square magnitude comprises computing a square value of a real component of said sum of plus one product shift.

49. The method of claim 36, wherein said timing error is equal to said difference between right cross-correlation point and left cross-correlation point.

50. A computer readable medium storing computer executable code for performing the method of claim 36.

51. A method for estimating a correlation level indicative of at least a correlation between a received signal and a ghost thereof, comprising:
  calculating a sum of zero product shift;
  calculating a center cross-correlation point based on said sum of zero product shift; and
  calculating a correlation level indicative of a correlation between said received signal and said ghost thereof based on said center cross-correlation point;
  wherein calculating said sum of zero product shift comprises the following:
    a) initializing an index variable and a first summation variable;
    b) sampling said received signal;
    c) obtaining first reference signal from storage, said storage storing a number of reference signals, including said first reference signal;
    d) adding to said first summation variable the result of a complex number multiplication of said first reference signal with said received signal;
    e) comparing the index variable to the number of reference signals in said storage;

f) if said comparison result indicates inequality then repeating operations b) through f).

52. The method of claim 51, wherein said index variable is initialized to the value three.

53. The method of claim 51, wherein said first summation variable is initialized to the value zero.

54. The method of claim 51, wherein said first reference contains data of a references signal pointed to by the index variable.

55. The method of claim 51, wherein said received signal is a sampled signal of an orthogonal frequency division multiplexing (OFDM) demodulated signal.

56. A method of performing fine synchronization in the time domain, comprising:

storing reference signals;

receiving a signal;

calculating sum of zero product shift, sum of minus one product shift, and sum of plus one product shift, based on at least said reference signals and the received signal;

computing left, center, and right cross-correlation points based on said sum of minus one product shift, said sum of plus one product shift, and said sum of zero product shift;

estimating timing error of said received signal based on said left cross-correlation point and said right cross-correlation point;

estimating common phase error of said received signal based on said sum of zero product shift; and calculating correlation level indicative of at least a correlation between said received signal and a ghost thereof based on said center point.

* * * * *